United States Patent [19]
Kobayashi

[11] Patent Number: 6,085,038
[45] Date of Patent: Jul. 4, 2000

[54] OPERATION APPARATUS FOR WATER PROOF DEVICE

[75] Inventor: Kazuharu Kobayashi, Saitama, Japan

[73] Assignee: Asahi Kogaku Kogyo Kabushiki Kaisha, Tokyo, Japan

[21] Appl. No.: 09/246,954

[22] Filed: Feb. 9, 1999

[30] Foreign Application Priority Data

Feb. 12, 1998 [JP] Japan ................................. 10-029735

[51] Int. Cl.[7] .................................................. G03B 17/24
[52] U.S. Cl. ............................................ 396/29; 396/543
[58] Field of Search ................................ 396/25, 27, 29, 396/543

[56] References Cited

U.S. PATENT DOCUMENTS 5,371,359   12/1994   Hagiuda et al. ......................... 396/25

Primary Examiner—David M. Gray
Attorney, Agent, or Firm—Greenblum & Bernstein, P.L.C.

[57] ABSTRACT

An operation apparatus for a water proof device includes an operation member which is rotatably or slidably supported on an outer surface of a water tight casing of a water proof device, a water tight transparent window formed in the casing that is covered by the operation member, a reflection type photocoupler provided inside the transparent window, and a reflection code pattern provided on the surface of the operation member that is opposed to the transparent window. The reflection code pattern is provided with different reflectances for light emitted from the light emitter of the photocoupler, so that the amount of light to be received by the light receiver of the photocoupler can be varied in accordance with the operation position of the operation member.

9 Claims, 2 Drawing Sheets

2

OPERATION APPARATUS FOR WATER PROOF DEVICE

BACKGROUND OF THE INVENTION

1. Field of the Invention

The present invention relates to an operation apparatus for a water proof device, such as a water proof camera, etc.

2. Description of the Related Art

For instance, in a water proof camera, a shutter speed, an aperture, or a photographing mode is set by an operation member which can be externally actuated. The operation member is usually made of a rotary member or a linearly slidable member. It is necessary to seal a rotating portion or sliding portion in a water-tight fashion by a seal member such as an O-ring or a packing, etc. However, the water tight structure using such a seal member is complex and inevitably increases the number of elements and assembling processes.

SUMMARY OF THE INVENTION

It is an object of the present invention to provide a simple and inexpensive operation apparatus for a water-proof device in which the water tightness can be reliably obtained without using a seal member.

To achieve the object mentioned above, according to the present invention, there is provided an operation apparatus for a water proof device including an operation member which is rotatably or slidably supported on an outer surface of a water tight casing of a water proof device; a water tight transparent window formed in the portion of the casing that is covered by the operation member; a reflection type photocoupler having a light emitter and a light receiver, provided inside the transparent window; and a reflection code pattern provided on the surface of the operation member that is opposed to the transparent window, the reflection code pattern being provided with different amounts of reflectance for light emitted from the light emitter of the photocoupler, so that the amount of light to be received by the light receiver of the photocoupler can be varied in accordance with the operation position of the operation member.

To increase the quantity of data obtained or set by the operation member, a plurality of reflection type photocouplers can be juxtaposed in a direction perpendicular to the direction of the movement of the operation member, and a plurality of reflection code patterns corresponding to the reflection type photocouplers can be provided.

The reflection code patterns can be adapted to detect absolute positions of the operation members or the displacement of the operation members.

The water proof device can be a camera, and the operation member can be a shutter speed setting dial, an aperture setting dial, or a photographing mode setting dial for the camera.

The present disclosure relates to subject matter contained in Japanese Patent Application No. 10-29735 (filed on Feb. 12, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
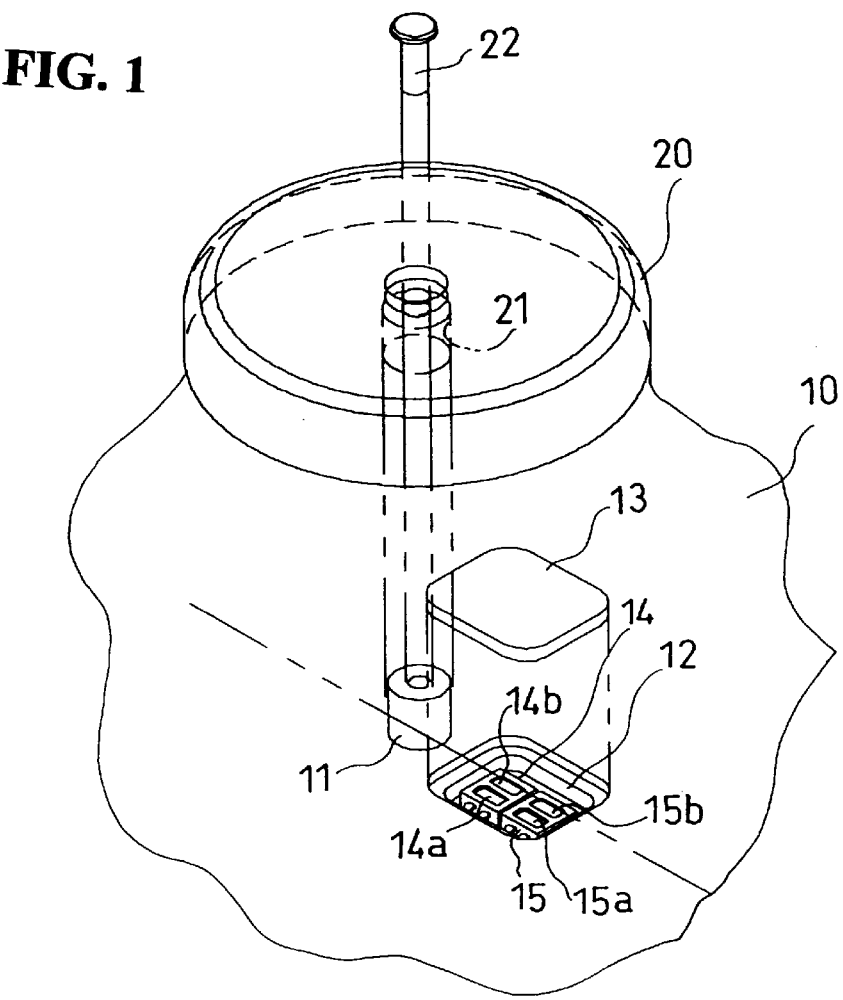
FIG. 1 is an exploded perspective view of an operation member for a water proof device according to an embodiment of the present invention.
Figure 2:
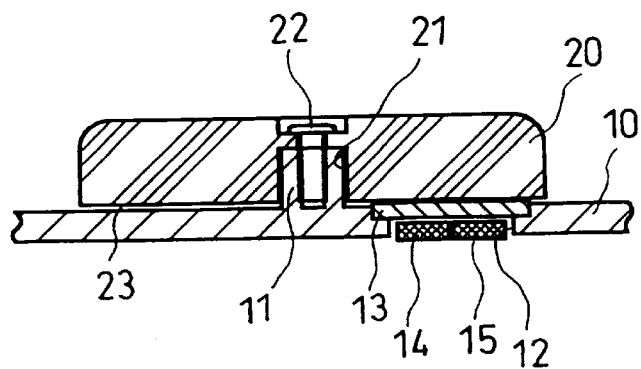
FIG. 2 is a sectional view of an assembly of an operation member for a water proof device shown in FIG. 1.

A water tight casing (water proof camera body) 10 for a water proof camera is provided on the outer surface thereof with a rotation center projection 11. An operation dial 20 in the form of a circular disc in a plan view is provided with a center hole 21 in which the rotation center projection 11 can be fitted. The operation dial 20 is rotatably supported on the casing 10, so as not to slip-off, by screwing a screw 22 in a threaded hole of the center projection 11 of the casing 10 through the center of the operation dial 20.

The casing 10 is provided, on a portion thereof which is covered by the operation dial 20, with an opening (through hole) 12 which is closed by a transparent cover 13 adhered thereto in a water tight fashion to form a transparent window. Two reflection type photocouplers (photo-reflectors) 14 and 15 are provided juxtaposed inside the transparent cover (window) 13 in a radial direction with respect to the center projection 11. Namely, the reflection type photocouplers 14 and 15 are located side by side in a direction perpendicular to the direction of the movement (rotation) of the operation dial 20. The reflection type photocouplers 14 and 15 are each composed of a light emitter 14a (15a) and a light receiver 14b (15b). The light emitters 14a and 15a emit light from the inside of the transparent window 13 toward the outside thereof. The light receivers 14b and 15b receive light reflected by a reflector provided outside of the transparent window 13 toward the inside of the transparent window.

The operation dial 20 is provided on a surface opposed to the transparent window 13 (the rear surface or lower surface thereof) with a code plate 23 adhered thereto. The code plate 23 has a predetermined reflection pattern, opposed to the photocouplers 14 an 15.

Figure 3:
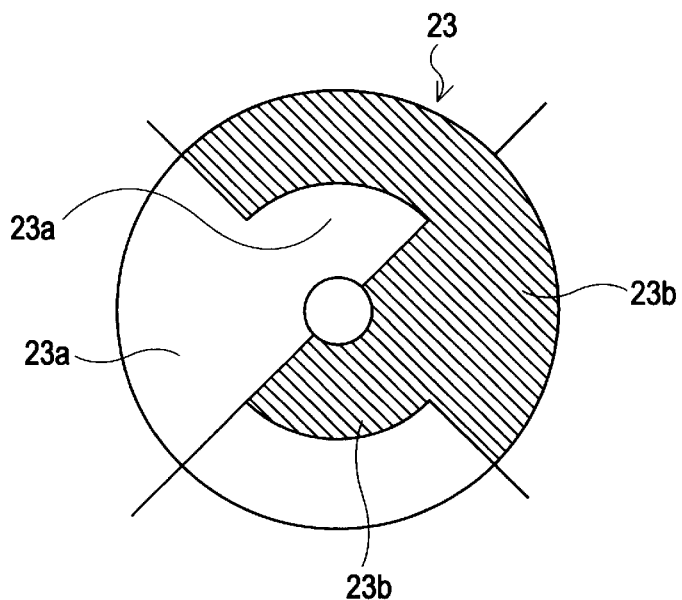
FIG. 3 is a plan view of an example of a reflection code pattern provided on an operation member.

FIG. 3 shows an example of a reflection pattern of the code plate 23. The code plate 23 is provided, on the outer peripheral portion thereof corresponding to the reflection type photocoupler 15, with a first pattern of a light reflecting portion (white) 23a and a light absorbing portion (black) 23b, and on the inner peripheral portion corresponding to the reflection type photocoupler 14, with a second pattern of a light reflecting portion (white) 23a and a light absorbing portion (black) 23b. The first pattern is different from the second pattern. The light emitted from the light emitters 14a, 15a and made incident upon the light reflecting portion (white) 23a is reflected by the light reflecting portion 23a and is received by the light receivers 14b, 15b. The light emitted from the light emitters 14a, 15a and made incident upon the light absorbing portion (black) 23b is absorbed thereby, so that no light is received therefrom by the light receiver 14b or 15b. Consequently, a combination of the outputs of the light receivers 14b and 15b varies depending on the angular position of the operation dial 20. In the code plate 23 shown in FIG. 3, the absolute angular position of the operation dial 20 can be detected at an interval of 90 degrees.

Figure 4:
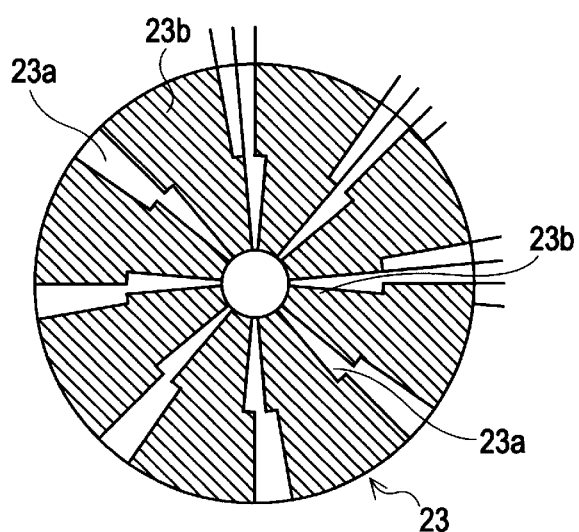
FIG. 4 is a plan view of another example of a reflection code pattern provided on an operation member.

FIG. 4 shows another example of the reflection pattern code plate 23 having outer and inner peripheral patterns of the light reflecting portion (white) 23a and the light absorbing portion (black) 23b. Specifically, the arrangement and pitch of the light reflecting segments (portions) 23a and the light absorbing segments (portions) 23b are selected so that the angular displacement of the operation dial 20 can be detected by detecting points at which the outputs of the light receivers 14b and 15b vary. In other words, according to the present embodiment, the amount of movement of the operation dial 20 can be detected. The reflection pattern is not limited to that shown in FIG. 3 or 4 and can be modified appropriately.

In the operation apparatus mentioned above, when the operation dial 20 is rotated while the reflection type photocouplers 14 and 15 are activated, the outputs of the light receivers 14b and 15b vary in accordance with the pattern of the light reflecting portion (white segments) 23a and the light absorbing portion (black segments) 23b. Consequently, for example, the shutter speed, the aperture (diaphragm), and/or the photographing mode can be modified in accordance with the change in the output. A click stop mechanism (not shown) can be provided between the operation dial 20 and the casing 10. If utilized in a camera, the reflection type photocouplers 14 and 15 can be driven when a main switch of the camera is turned ON.

Although the illustrated embodiment is applied to an operation member in the form of a rotary dial, the present invention can be equally applied to an operation member which is linearly and reciprocally moved.

As can be understood from the foregoing, according to the present invention, a simple and inexpensive operation apparatus for a water-proof device in which the water tightness can be certainly obtained without using a seal member such as a packing can be provided.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An operation apparatus for a water proof device, comprising:

an operation member which is rotatably supported on an outer surface of a water tight casing of said water proof device;

a water tight transparent window formed in the portion of the casing that is covered by the operation member;

a photocoupler having a light emitter and light receiver, said photocoupler provided inside the transparent window; and a reflection code pattern provided on the surface of the operation member that is opposed to the transparent window, said reflection code pattern being provided with different amounts of reflectance for light emitted from the light emitter of the photocoupler, wherein the amount of light to be received by the light receiver of the photocoupler can be varied in accordance with the operation position of the operation member, said photocoupler comprising a plurality of photocouplers provided inside the transparent window and positioned with respect to each other along a direction perpendicular to a tangent to the direction of rotational movement of the operation member, and said reflection code pattern comprising a plurality of reflection code patterns corresponding to the plurality photocouplers.

2. An operation apparatus for a water proof device according to claim 1, wherein said reflection code patterns are adapted to detect absolute positions of the operation members.

3. An operation apparatus for a water proof device according to claim 1, wherein said reflection code patterns are adapted to detect the amount of movement of the operation members.

4. An operation apparatus for a water proof device according to claim 1, wherein said water proof device is a camera.

5. An operation apparatus for a water proof device according to claim 4, wherein said operation member comprises a shutter speed setting dial of said camera.

6. An operation apparatus for a water proof device according to claim 4, wherein said operation member comprises an aperture setting dial of said camera.

7. An operation apparatus for a water proof device according to claim 4, wherein said operation member comprises a photographing mode setting dial of said camera.

8. The operation apparatus for a water proof device according claim 1, said plurality of reflection code patterns being positioned with respect to each other along a direction perpendicular to a tangent to the direction of rotational movement of operation member.

9. The operation apparatus for a water proof device according to claim 1, the light emitter and the light receiver of each photocoupler of said plurality of photocouplers being positioned with respect to each other in a direction substantially perpendicular to the direction of positioning of the plurality of photocouplers with respect to each other.

* * * * *